(12) United States Patent
Noda

(10) Patent No.: US 6,368,009 B1
(45) Date of Patent: Apr. 9, 2002

(54) ATTACHMENT DEVICES

(75) Inventor: Nobuhisa Noda, Kariya (JP)

(73) Assignee: Neo-Ex Lab, Inc., Toyota (JP)

( * ) Notice: Subject to any disclaimer, the term of this patent is extended or adjusted under 35 U.S.C. 154(b) by 0 days.

(21) Appl. No.: 09/619,667

(22) Filed: Jul. 19, 2000

(30) Foreign Application Priority Data

Aug. 31, 1999 (JP) ............................................ 11-245924

(51) Int. Cl.[7] ................................................ F16B 13/04
(52) U.S. Cl. ...................................... 403/329; 403/397
(58) Field of Search ................................ 403/326, 329, 403/397, 408.1; 24/458, 453; 411/38, 344, 345; 248/222.12, 73; 296/97.13, 97.11, 97.9

(56) References Cited

U.S. PATENT DOCUMENTS

| | | | |
|---|---|---|---|
| 3,889,320 A | | 6/1975 | Koscik |
| 4,122,583 A | | 10/1978 | Grittner et al. |
| 4,318,650 A | | 3/1982 | LLauge |
| 4,569,552 A | | 2/1986 | Marks |
| 4,902,068 A | | 2/1990 | Dowd et al. |
| 4,920,618 A | | 5/1990 | Iguchi |
| 4,927,287 A | * | 5/1990 | Ohkawa et al. .......... 403/408.1 |
| 5,062,608 A | | 11/1991 | Phelps et al. |
| 5,082,323 A | | 1/1992 | Dowd et al. |
| 5,269,060 A | | 12/1993 | Dowd et al. |
| 5,358,299 A | * | 10/1994 | Seto ........................... 296/97.9 |
| 5,411,310 A | * | 5/1995 | Viertel et al. .............. 296/97.9 |
| 5,507,545 A | * | 4/1996 | Krysiak ..................... 296/97.9 |
| 5,560,575 A | * | 10/1996 | Krysiak ................. 248/222.12 |
| 5,560,669 A | * | 10/1996 | Gute .......................... 296/97.9 |
| 5,845,883 A | * | 12/1998 | Meyer .......................... 248/73 |
| 6,196,756 B1 | * | 3/2001 | Leverger .................... 403/326 |

FOREIGN PATENT DOCUMENTS

| | | |
|---|---|---|
| EP | 0346155 | 12/1989 |
| EP | 0415509 | 3/1991 |
| FR | 2761127 | 9/1998 |
| GB | 1206899 | 9/1970 |
| WO | 9961807 | 12/1999 |

* cited by examiner

Primary Examiner—Lynne H. Browne
Assistant Examiner—John R. Cottingham
(74) Attorney, Agent, or Firm—Dennison, Scheiner & Schultz

(57) ABSTRACT

Attachment devices are taught that preferably include at least one compressible leg interconnected to at least one non-compressible leg. Preferably, the non-compressible leg includes a stopper for generating a compressing force in the compressible leg during an attachment operation. After the attachment device has been installed and the compressible leg exerts a retaining force against the object to which it is attached, an engagement lip preferably retains the compressible leg in the compressed state to provide a secure and reliable attachment.

24 Claims, 6 Drawing Sheets

ATTACHMENT DEVICES

BACKGROUND OF THE INVENTION

1. Field of the Invention

The present intention relates to attachment devices, e.g., clamps, clips and other such devices, which can be attached to panels, e.g. vehicle body panels.

2. Description of the Related Art

FIG. 8 shows an example of a known attachment device or clamp 101 for securing a wiring harness 100 to a vehicle body panel 111. The clamp 101 is constructed as one integral piece and is formed by resin molding. The clamp 101 includes a base body or clamp body 103 for holding a wiring harness 100 and an engagement body 102 that can be inserted into a mounting hole 112 formed in the panel 111. The engagement body 102 includes a central pillar 102a, which extends from a base surface 103a of the clamp body 103, and a pair of flexible retaining legs 102b. The legs 102b extend from the free end of the pillar 102a back toward the clamp body 103 in a folded fashion. Each of the retaining legs 102b has a step or shoulder 102c formed on its distal end. The shoulder 102c is adapted to elastically engage the surface of the panel 111 around the mounting hole 112.

As the engagement body 102 is pressed into the mounting hole 112 of the panel 111, the retaining legs 102b flex inwardly as a result of forced contact with the periphery of the mounting hole 112. The engagement body 102 is inserted until the base surface 103a of the clamp body 103 contacts the outer surface of the panel 111. At this time, the retaining legs 102b widen again, due to the elasticity of the legs 102b, so that the shoulders 102c engage the opposite surface of the panel 111 around the mounting hole 112. Thus, the clamp 101 is attached to the panel 111.

The known clamp 101 can be attached to a panel 111 in one operation, i.e., by simply pushing the engagement body 102 into the mounting hole 112. However, if the thickness of the panel 111 is different from the ideal thickness T of the panel 111 for the particular dimensions of the clamp 101, the clamp 101 will not be securely attached to the panel 111. That is, if the thickness of the panel 111 is less than the ideal thickness T, the shoulders 102c will only loosely engage the panel and the clamp 101 cannot be firmly attached to the panel 111. On the other hand, if the thickness of the panel 111 is greater than the ideal thickness T, the shoulders 102c cannot substantially engage the panel surface and the clamp 101 cannot be attached to the panel 111. As a result, it is necessary to maintain an inventory of clamps having a variety of dimensions in order to utilize the appropriate sized clamps for panels having thicknesses that differ, e.g., as a result of panel manufacturing variations. As a result, manufacturing costs are increased due to the need to maintain such an inventory of attachment devices of different sizes and shapes.

SUMMARY OF THE INVENTION

It is, accordingly, an object of the present teachings to teach improved attachment devices that overcome the problems of the known attachment device.

In one aspect of the present teachings, attachment devices are taught that can be reliably and securely attached to panels having different thicknesses.

In another aspect of the present teachings, attachment devices are taught that include at least one compressible leg and at least one non-compressible leg. As the attachment device is pushed into a panel aperture, preferably the non-compressible leg transmits a compression force to the compressible leg. At that time, the compressible leg deforms or compresses and asserts an elastic pressure against the panel. The non-compressible leg also preferably includes a means for fixing the attachment device in position once it is installed, so that the compressible leg continues to push against the panel and securely attaches the attachment device to the panel.

Thus, attachment devices can be attached to a panel in one simple operation by pressing the compressible and non-compressible legs of the attachment device into a mounting hole of the panel while axially deforming or compressing the compressible leg until the means for fixing the attachment device to the panel becomes engaged once the attachment device is fully inserted into the mounting hole. As a result, the attachment device is fixed to the panel by the combined actions of the elastic restoring force of the elastically deformed compressible leg and the means for fixing the attachment device in position once it is installed. Because of this design, the attachment device can be securely attached to the panel, even if the thickness of the panel varies from an ideal thickness.

Additional objects, features and advantages of the present invention will be readily understood after reading the following detailed description together with the accompanying drawings and the claims.

DETAILED DESCRIPTION OF THE INVENTION

Figure 1:
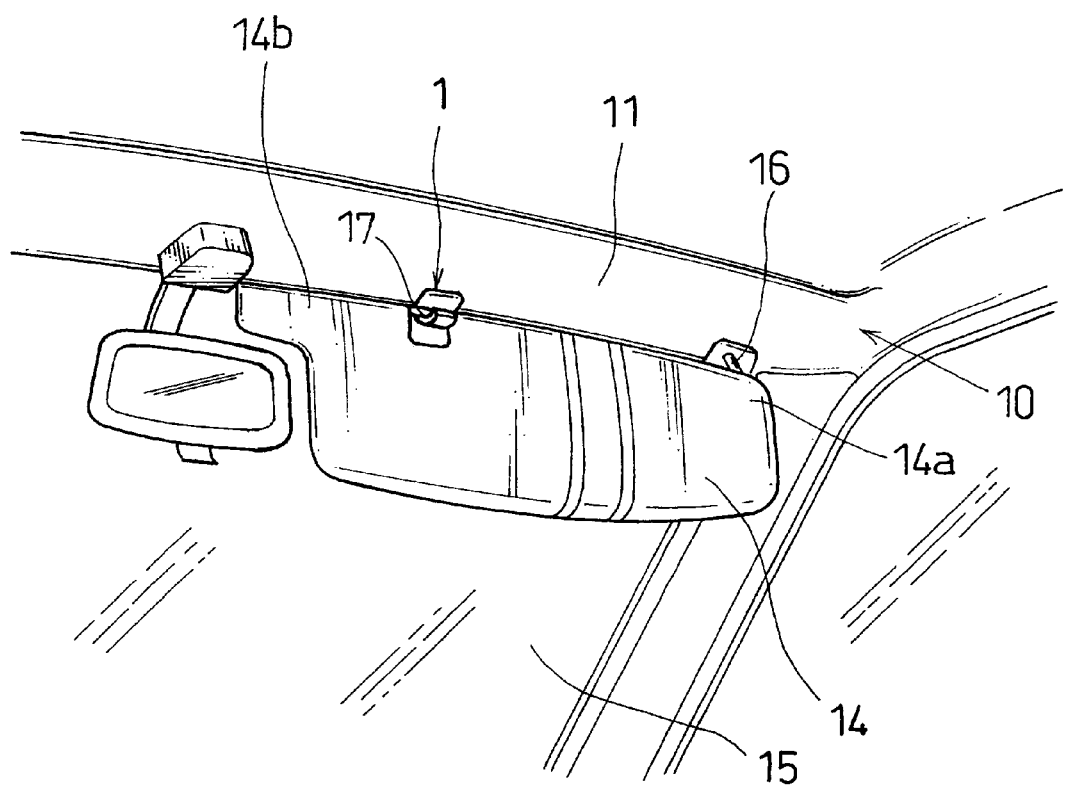
FIG. 1 is a partial perspective view showing the interior of a vehicle cabin having a sun visor and a representative sun visor holder.

Attachment devices are taught that have a base body and at least one compressible leg perpendicularly extending from the base body. Preferably, the compressible leg is adapted to elastically deform when an axial compression force is applied to the ends of the compressible leg. The compressible leg may terminate at a terminal end and at least one non-compressible leg may perpendicularly extend from the terminal end back toward the base body and in parallel with the compressible leg. Preferably, the compressible leg and the non-compressible legs are generally straight before the attachment device is inserted into a mounting hole of a panel. Also, the non-compressible leg is preferably adapted to elastically engage the base body when the compressible leg is in a compressed state to prevent the compressible leg from returning to an extended or straight state. This feature ensures that the attachment device is securely attached to the panel in the compressed state.

More preferably, the attachment device includes a pair of opposing compressible legs and a pair of opposing non-compressible legs. The pair of opposing compressible legs and the pair of opposing non-compressible legs may be alternately disposed about a square or rectangular shaped terminal end that connects the pair of opposing compressible legs and the pair of opposing non-compressible legs. Thus, the compressible legs and non-compressible legs alternate in parallel around the four sided terminal end.

The base body may also include a bore (aperture) and a shoulder may be formed within the bore (aperture). The non-compressible leg may include, for example, an engagement lip that is adapted to engage the bore shoulder when the compressible leg is deformed into the compressed state. Any type of structure may be utilized to perform this function as long as the structure can maintain the compressible leg in the compressed state, so that the compressible leg continues to exert pressure against the panel after the attachment device has been installed in the mounting hole.

The attachment device may further include a retaining component that is integrally formed with the base body. The retaining component may be, for example, a wire harness, a belt clamp or a hook-like holding portion that is adapted to receive a bar-like component.

Each of the additional features and method steps disclosed above and below may be utilized separately or in conjunction with other features and method steps to provide improved attachment devices and methods for designing and using such attachment devices. Representative examples of the present invention, which examples utilize many of these additional features and method steps in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention.

A representative embodiment of the present teachings will now be described with reference to FIGS. 1 to 7, in which a sun visor holder is described as one example of an attachment device that can be prepared utilizing the present teachings.

As shown in FIG. 1, a representative vehicle sun visor 14 has been connected to a vehicle roof panel 11 to permit rotation via an L-shaped support arm 16 attached to one end 14a of the sun visor 14. Thus, the sun visor 14 can move relative to the inner surface of the roof panel 11 that is adjacent to the windshield 15. Also, the representative sun visor 14 has a support bar 17 that is provided on the other end 14b of the sun visor 14. The support bar 17 is adapted to rotatably engage a sun visor holder 1 that is attached to the inner surface of the roof panel 11. As a result, the sun visor 14 can rotate with respect to the inner surface of the roof panel 11 when the support bar 17 is engaged with the sun visor holder 1.

A representative sun visor holder 1 is shown in FIGS. 2 to 7. This representative sun visor holder 1 includes a clamp or attachment device 5 to secure the sun visor holder 1 to the roof panel 11 by pressing the attachment device 5 into a mounting hole formed in the roof panel 11. The holder 1 preferably includes a base body or holder body 2 that is adapted to hold the support bar 17 of the sun visor 14. The holder body 1 and the attachment device 5 may be fabricated in one piece using resin-molding techniques.

Figure 4:
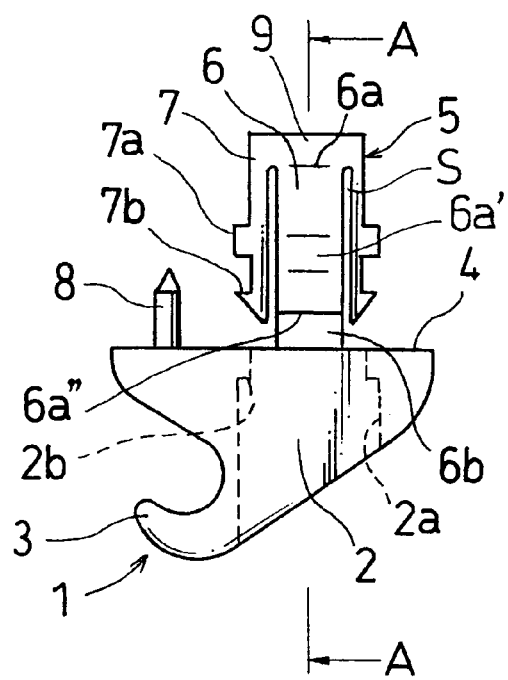
FIG. 4 is a side view showing the representative sun visor holder before it is attached to a vehicle panel.

A hook portion 3 that is adapted to rotate and receive the support bar 17 (FIG. 1) may extend from the holder body 2. In addition, a base surface 4 that is broader than the mounting hole 12 of the panel 11 is formed on the holder body 2 opposite of the hook portion 3. A bore or aperture 2a of rectangular shape in cross section is formed in the holder body 2 and the bore 2a may extend substantially perpendicular to the base surface 4. Further, as shown in FIG. 4, shoulders 2b are formed on opposite sides of the bore 2a.

The attachment device 5 extends substantially perpendicularly from the base surface 4 and is substantially aligned with the bore 2a. The attachment device 5 is a hollow structure that also has an exterior shape that is rectangular in cross section, which shape substantially corresponds to the dimensions of the mounting hole 12. The attachment device 5 may include a pair of compressible legs 6 and a pair of non-compressible legs 7. Both sets of legs 6, 7 may be connected at a terminal end 9.

Figure 2:
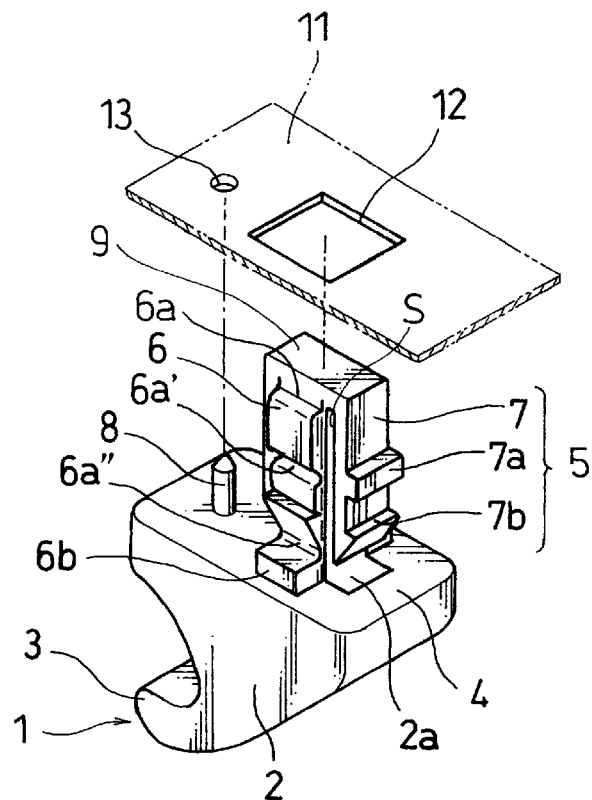
FIG. 2 is a perspective view showing the representative sun visor holder before it is attached to a vehicle panel.
Figure 3:
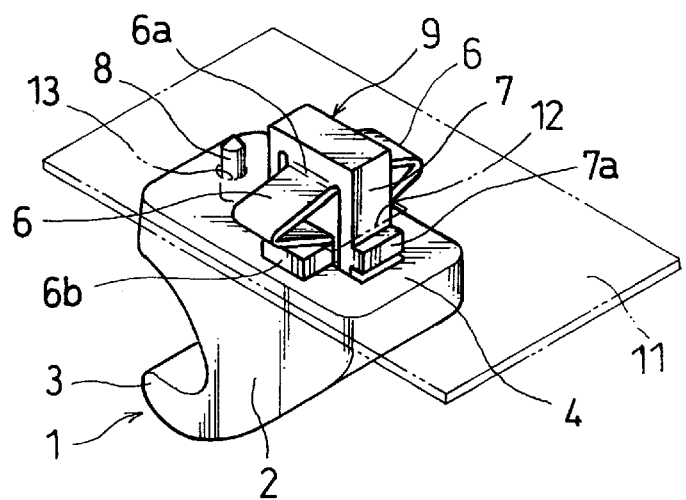
FIG. 3 is a perspective view showing the representative sun visor holder after it has been attached to the vehicle panel.
Figure 5:
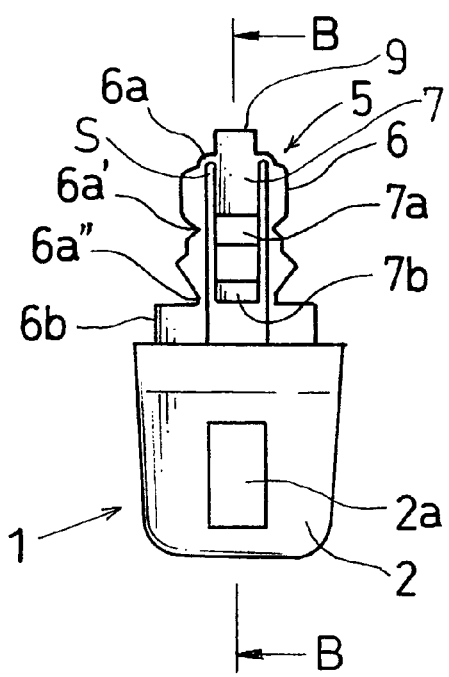
FIG. 5 is a rear elevational view showing the representative sun visor holder before it is attached to a vehicle panel.

As shown in FIGS. 2 and 5, the compressible legs 6 extend substantially perpendicularly from the base 4 and are disposed on opposite sides of the terminal end 9. A block-like portion 6b may preferably connect the attachment device 5 to the base 4. Each of the compressible legs 6 preferably has an upper thinned portion or creased line 6a along which each compressible leg 6 can fold. The thinned portion or creased line 6a functions as a means for assisting the deformation or compression of the compressible legs 9. The compressible legs 6 may be interconnected through the terminal end 9.

Each of the base portions 6b may have a thickness that substantially corresponds to the thickness of an interior cover sheet (which will be hereinafter described). In addition, each of the compressible legs 6 may include a central thinned portion 6a' and a lower thinned portion 6a". As will be recognized, the three thinned portions 6a, 6a' and 6a" also may function as deformation assist means that permit the compressible legs 6 to elastically deform, e.g., to outwardly fold in a V-shape, when the compressible legs 6 are subjected to a compression force applied to the two ends of the compressible legs 6.

As shown in FIGS. 2 and 4, the non-compressible legs 7 are preferably cantilevered and extend downwardly from the terminal end 9 toward the base surface 4 of the holder body 2. The non-compressible legs 7 are also disposed on opposite sides of the terminal end 9. Thus, the compressible legs 6 and the non-compressible legs 7 alternate in order around the longitudinal axis of the attachment device 5 and correspond to four sides of the terminal end 9 and the four edges of the mounting hole 12. Further, the compressible legs 6 and the non-compressible legs 7 are arranged so that the non-compressible legs 7 are disposed on the same sides as the shoulders 2b of the bore 2a. Slits or spaces S are formed between the respective compressible legs 6 and the non-compressible legs 7. The width of the slits S may be adjusted as desired.

Each of the non-compressible legs 7 preferably has a means for contacting the panel surface 11a and thus transmitting a compressive force to ends of the compressible legs 6 when the attachment device 5 is pressed into the mounting hole 12. For example, each of the non-compressible legs 7 may have a transverse stopper projection 7a that perpendicularly projects from a central portion of the non-compressible leg 7. The non-compressible legs 7 also preferably include a means for engaging the bore shoulders 2b after the compressible legs 6 have been compressed. For example, each of the non-compressible legs 7 may include a transverse engagement lip 7b that outwardly projects from the free end of the non-compressible leg 7. Each of the stopper projections 7a preferably has a thickness that substantially corresponds to the thickness of the interior cover sheet (which will be hereinafter described). In other words, the stopper projection 7a has substantially the same thickness as the base portion 6b of each compressible leg 6. Each of the engagement lips 7b is adapted to elastically engage the shoulder 2b of the bore 2a.

The sun visor holder 1 may optionally include a positioning pin 8 which can be inserted into a positioning hole 13 formed in the panel 11. The pin 8 may vertically extend from the base surface 4 of the holder body 2, and preferably, is spaced apart from the attachment device 5. As will be understood, the pin 8 can assist the positioning of the holder 1 with respect to the roof panel 11 and prevent the holder 1 from rotating after the holder 1 has been attached to the roof panel 11.

Figure 6:
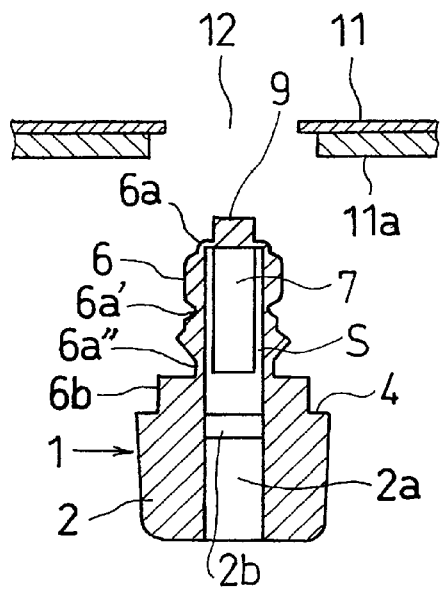
FIG. 6(A) is a sectional view taken along the line A—A of the representative sun visor holder shown in FIG. 4 before insertion into the vehicle panel.
FIG. 6(B) is a sectional view taken along the line A—A of the representative sun visor holder shown in FIG. 4 as it is being inserted into the vehicle panel.
FIG. 6(C) is a sectional view taken along the line A—A of the representative sun visor holder shown in FIG. 4 as it contacts the vehicle panel.
FIG. 6(D) is a sectional view taken along the line A—A of the representative sun visor holder shown in FIG. 4 after the insertion has been completed.
Figure 6:
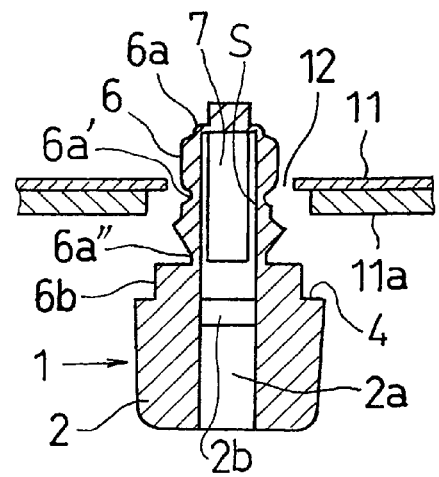
Figure 6:
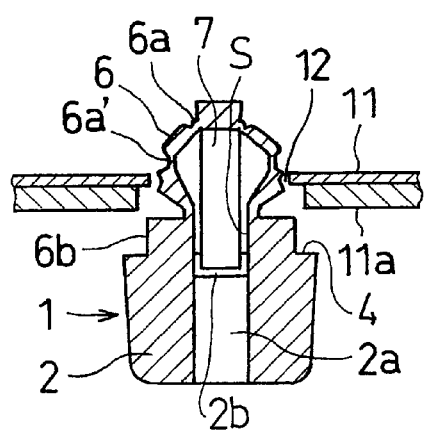
Figure 6:
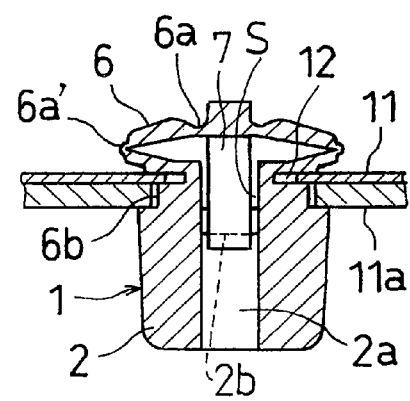

A representative method for attaching the representative holder 1 to the roof panel 11 will now be described with reference to FIGS. 6(A) to 7(D). FIGS. 6 and 7 each show four stages of the attachment operation. FIG. 6 shows the changes in the compressible legs 6 while the attachment device is being inserted into the mounting hole 11. FIG. 7 shows the changes in the non-compressible legs 6 while the attachment device is being inserted into the mounting hole 11. Thus, FIGS. 6 and 7 simply represent the same steps viewed 90 degrees apart around the longitudinal axis of the attachment device 5.

Figure 7A:
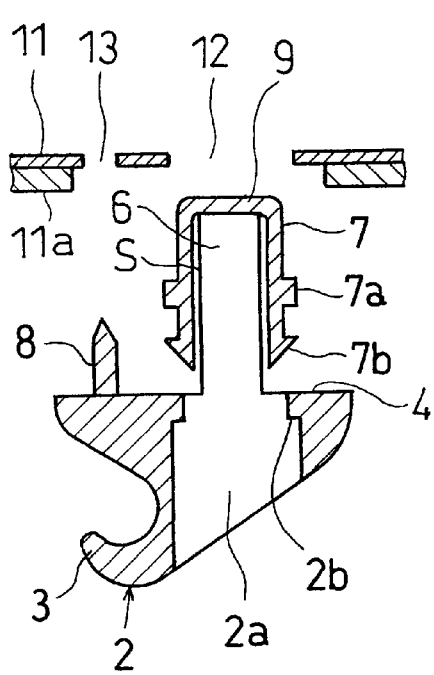
FIG. 7(A) is a sectional view taken along the line B—B of the representative sun visor holder shown in FIG. 5 before insertion into the vehicle panel.

As shown in FIGS. 6(A) and 7(A), the holder 1 is first positioned in such a way that the attachment device 5 is directed toward the mounting hole 12 of the roof panel 11. As further shown in FIGS. 6(A) and 7(A), an interior cover sheet 11a is provided adjacent to the roof panel 11 and has an opening that permits the attachment device 5 and the positioning pin 8 to be inserted into the mounting hole 12 and the positioning hole 13, respectively.

Figure 7B:
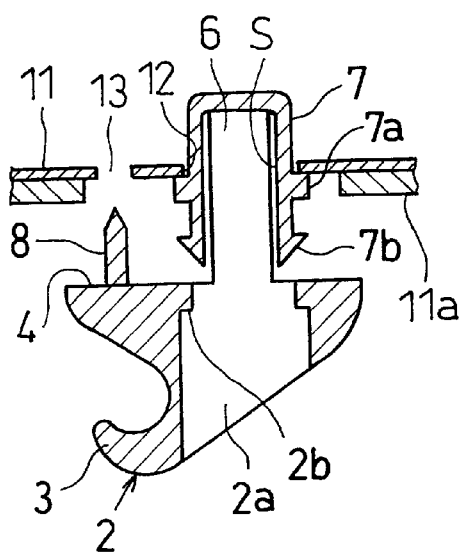
FIG. 7(B) is a sectional view taken along the line B—B of the representative sun visor holder shown in FIG. 5 as it is being inserted into the vehicle panel.

As shown in FIGS. 6(B) and 7(B), the holder 1 is then pushed upwardly (i.e., inserted into the mounting hole 12) while directing the positioning pin 8 into the positioning hole 13 until the stopper projections 7a on the non-compressible legs 7 contact the interior surface of the roof panel 11. Naturally, this step of the attachment operation can be performed without applying a substantial pressing force.

Thereafter, a more substantial pressing force is applied to the holder 1 to complete the attachment operation. Naturally, as further pressure is applied, the non-compressible legs 7 are prevented from being further inserted into the mounting hole 12, because the stopper projections 7a of the non-compressible legs 7 contact the panel interior surface. Thus, a compressive force, which is generated by further pressing the holder 1 while the stopper projections 7a contact the panel surface, is transmitted to the compressible legs 6 via the terminal end 9. Consequently, the compressible legs 6 will flex outwardly due to the three thinned portions 6a, 6a' and 6a". As a result, by pushing the holder 1 upwardly, the compressible legs 6 are introduced into the mounting hole 12 and then elastically flexed outwardly, as shown in FIG. 6(C).

Figure 7C:
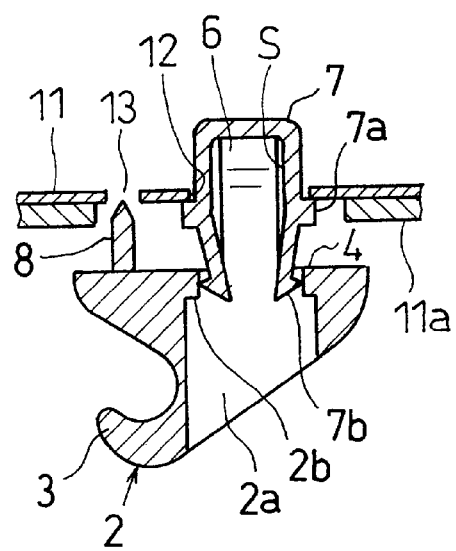
FIG. 7(C) is a sectional view taken along the line B—B of the representative sun visor holder shown in FIG. 5 as it contacts the vehicle panel.

When the compressible legs 6 are compressed, the distance between the terminal end 9 and the base 4 is reduced. Therefore, the lower ends of the non-compressible legs 7 will be pushed into the bore 2a of the holder body 2. In order to pass surface of the bore 2a, the engagement lips 7b will elastically flex inwardly until passing the shoulders 2b, as shown in FIG. 7(C).

Figure 7D:
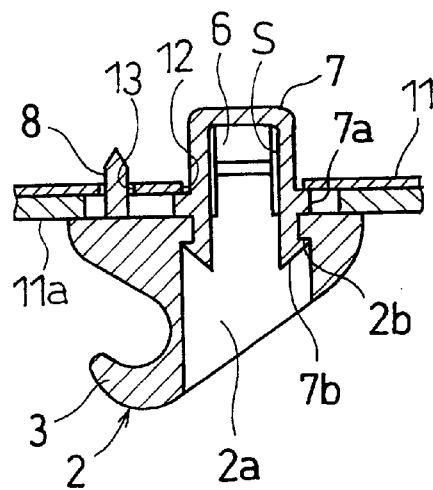
FIG. 7(D) is a sectional view taken along the line B—B of the representative sun visor holder shown in FIG. 5 after the insertion has been completed.
Figure 8:
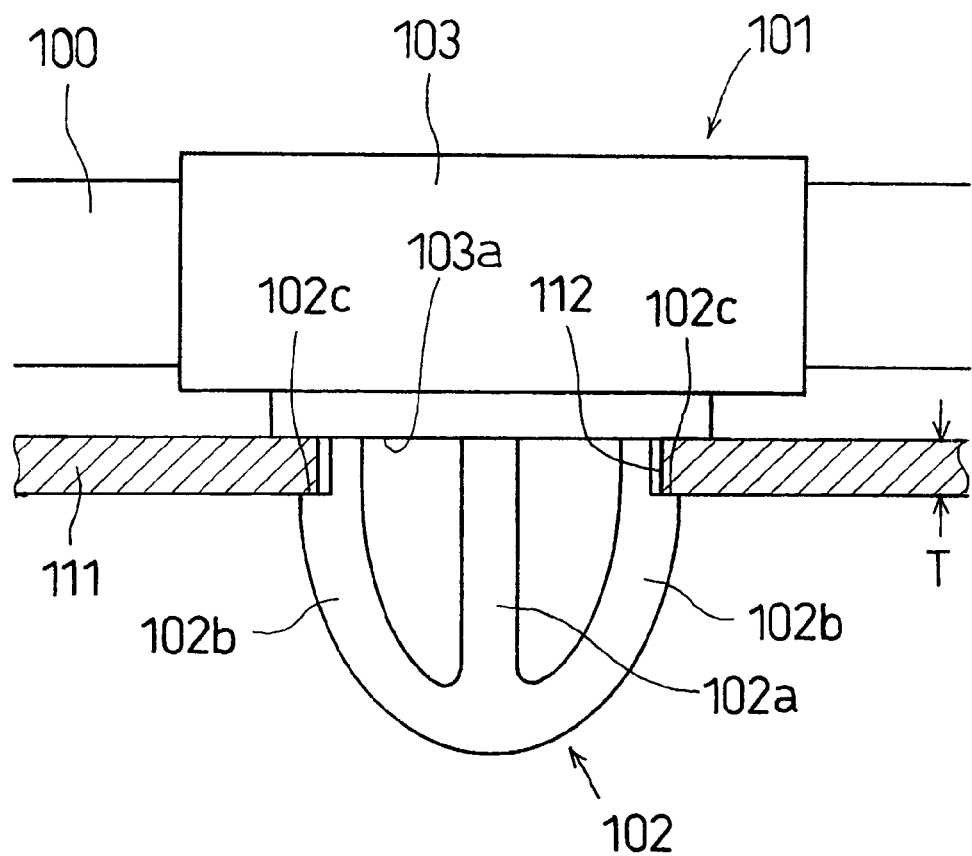
FIG. 8 is a sectional view showing a known attachment device.

The upward pressure on the holder 1 is continued until the upper surfaces of the base portions 6b of the compressible legs 6 contact the roof panel surface. As shown in FIG. 6(D), the compressible legs 6 will completely flex into a V-shape and thereby elastically engage the edges of the mounting hole 12. Likewise, as shown in FIG. 7(D), the lower sections of the non-compressible legs 7 are elastically outwardly restored so that the engagement lips 7b of the non-compressible legs 7 engage the shoulders 2b of the bore 2a. Thus, the base surface 4 of the holder body 2 will contact the lower surface of the stopper projection 7a of the non-compressible legs 7 and will also contact the interior cover sheet 11a, because the base portions 6b and the stopper projections 7a are substantially the same thickness as the interior cover sheet 11a. As a result, the holder 1 is securely attached to the roof panel 11 without a substantial clearance.

While the holder 1 is being pressed upwardly, the positioning pin 8 is inserted into the positioning hole 13, thereby preventing the holder 1 from rotating about its longitudinal axis.

After the holder 1 has been attached to the roof panel 11, as shown in FIG. 7(D), the engagement lips 7b engage the bore shoulders 2b and thus prevent the compressible legs 6 from extending and returning to the non-compressed (i.e., straight) state. That is, the engagement lips 2b ensure that the attachment device 5 does not loosen or separate from the roof panel 11. Thus, the holder 1 is fixed to and retained on the roof panel 11 in a manner that reliably supports the support bar 17 of the sun visor 14. Further, the holder 1 is held against the roof panel 11 by a restoring force generated by the elastically deformed compressible legs 6 that pushes against the roof panel 11. Thus, the attachment device 5 permits the holder to be securely attached to roof panels 11 having a variety of thicknesses.

The representative holder 1 is particularly advantageous because it can be attached to the roof panel 11 simply by pressing the attachment device 5 of the holder 1 into the mounting hole 12 of the roof panel 11. Therefore, the attachment device 5 can be quickly, simply, securely and reliably attached to the roof panel 11. As a result, the vehicle manufacturing process can be simplified and manufacturing costs can be reduced. Moreover, if the attachment device and the holder are fabricated as a one-piece construction, parts management is simplified and inventory costs can be reduced.

According to the representative example, the biasing force of the compressible legs 6 is symmetrically applied to the panel 11. Further, the non-compressible legs 7 symmetrically engage the edge of the mounting hole 12. Therefore, the holder 1 can be effectively stabilized after attachment. In addition, the compressible legs 6 can be precisely deformed in predetermined directions by virtue of the positions of the thinned portions 6a, 6a' and 6a".

Further, because the engagement lips 7b engage the bore shoulders 2b, the engagement lips 7b are protected from the effects of external force and thus, the engagement lips 7b can be prevented from unexpectedly disengaging from the shoulder 2b. As a result, the holder 1 will not unexpectedly fall out of or dislodge from the panel 11. However, if it becomes necessary to remove the holder 1 for any reason, the holder 1 can be easily removed from the roof panel 11 by simply flexing the engagement lips 7b inwardly and thus, disengaging the engagement lips 7b from the bore shoulders 2b.

As noted above, various changes and modifications may be made to the present teachings without departing from the scope of the invention. For example, the present teachings are not limited to sun visor holders and instead the present teachings may be utilized to form attachment devices, for example, on wire harness clamps, hose clamps, molding clips and other fastening devices. Further, the attachment device can be an integrally formed component, such as a molding, that is retained on the vehicle body.

The number of compressible legs 6 and non-compressible legs 7, as well as the width of the slits S, may be appropriately changed. Further, the design of the attachment device 5 of the holder 1 can be preferably changed so as to adapt various shapes of mounting holes (e.g., circular mounting holes and oval-mounting holes).

The type of deformation assist means is not limited to thinned portions 6a, 6a' and 6a". Rather, any type of deformation assist means can be used that will allow the compressible legs 6 to deform or bend in a predictable manner so that the compressible legs will apply a restoring force to the panel. For example, the deformation assist means also can be formed as perforations or score lines.

Moreover, the holder body 2 and the attachment device 5 may be formed separately and then integrally connected by an adhesive or other type of fastener.

The stopper means can be any type of structure that performs the function of generating a compressive force, as a result of the attachment device 5 being pressed into the mounting hole 12. Therefore, the stopper means is not limited to the contacting projection 7a formed on the non-compressible leg 7. For example, the stopper means can be a detent piece disposed on the panel 11, which detent piece is arranged so as to contact the terminal end 9 of the attachment device 5 when the attachment device 5 is pressed to the mounting hole to a desired position.

What is claimed is:

1. An attachment device comprising:
   a base body,
   at least one compressible leg comprising a first end and a second end, the first end being attached to the base body, the at least one compressible leg extending perpendicularly from the base body and being adapted to elastically deform when an axial compression force is applied to the first end and second end of the compressible leg,
   a terminal end attached to the second end of the compressible leg,
   at least one non-compressible leg extending from the terminal end toward the base body and substantially in parallel to the at least one compressible leg, the at least one non-compressible leg being adapted to engage the base body when the compressible leg is deformed to prevent the compressible leg from returning to an uncompressed state and,
   a retaining component integrally formed with the base body, the retaining component being a hook-like holding portion adapted to receive a bar-like component.

2. An attachment device as defined in claim 1 wherein the attachment device comprises a pair of opposing compressible legs and a pair of opposing non-compressible legs.

3. An attachment device as defined in claim 2 wherein the pair of opposing compressible legs and the pair of opposing non-compressible legs are alternately disposed.

4. An attachment device as defined in claim 1 wherein the base body comprises a bore and a shoulder is formed within the bore, and wherein the non-compressible legs each comprise an engagement lip that is adapted to engage the bore shoulder when the compressible leg has been deformed.

5. An attachment device as defined in claim 1 wherein the base body, the compressible leg, the terminal end and the non-compressible leg are integrally formed.

6. An attachment device adapted to engage a mounting hole in a panel, comprising:
   a base body and,
   an engagement body integrally connected to the base body, the engagement body being inserted into the mounting hole of the panel up to a detent position, the engagement body comprising:
   at least one elastically deformable leg extending from the base body,
   at least one means for contacting the panel to thereby generate a compression force when the engagement body is disposed within the panel mounting hole and the base body is pushed towards the panel, the compression force generating means transmitting the generated compression force to the elastically deformable leg, thereby causing the elastically deformable leg to elastically deform and engage the panel and,
   at least one means adapted to maintain the elastically deformable leg in a compressed state, wherein the compressed state maintaining means is coupled to the compression force generating means and engages the base body after the at least one elastically deformable leg has been deformed into the compressed state and thereby preventing the elastically deformable leg from returning to a non-compressed state.

7. An attachment device as defined in claim 6 wherein the attachment device comprises a pair of opposing elastically deformable legs and a pair of means for maintaining the elastically deformable leg in the compressed state.

8. An attachment device as defined in claim 7 wherein the pair of opposing elastically deformable legs and the pair of means for maintaining the elastically deformable leg in the compressed state are alternately disposed in parallel in relation to the base body.

9. An attachment device as defined in claim 6 wherein the base body comprises a bore and a shoulder is formed within the bore, and wherein the means for maintaining the elastically deformable leg in a compressed state comprises an engagement lip that is adapted to engage the bore shoulder when the elastically deformable leg has been deformed.

10. An attachment device as defined in claim 6 wherein the elastically deformable leg has a means for assisting deformation of the elastically deformable leg along a predictable deformation path.

11. An attachment device as defined in claim 6 wherein the base body has a bore with a shoulder, and wherein the means for maintaining the elastically deformable leg in a compressed state comprises an engagement lip that is adapted to engage the shouldered bore of the base body.

12. An attachment device as defined in claim 11 wherein the compression force generating means for comprises a stopper that is adapted to contact the panel when the device is pushed into the mounting hole.

13. An attachment device adapted for attachment to a panel, comprising:
    a base body; and,
    an engagement body integrally connected to the base body and being adapted to be inserted into a mounting hole formed in the panel, the engagement body comprising:
    an elastically deformable fixture member perpendicularly extending from the base body; and,
    an engagement member extending from the elastically deformable fixture member toward the base body, the engagement member having a stopper means that is adapted to contact the panel to thereby generate a compression force that is transmitted to the elastically deformable fixture member when the engagement body is introduced into the mounting hole, and an engagement means that is adapted to engage the base body after the elastically deformable fixture member has been deformed, wherein the elastically deformable fixture member elastically deforms due to the generated compression force and engages the panel when the base body is pressed towards the panel after the stopper means has contacted the panel.

14. An attachment device as defined in claim 13 wherein the stopper means comprises a transverse projection that is integrally formed on the engagement member, and wherein the engagement means comprises a transverse lip that is integrally formed in the engagement member.

15. An attachment device as defined in claim 14 wherein the base body comprises a bore having a shoulder and the transverse lip is adapted to engage the shoulder when the fixture member is deformed.

16. An apparatus adapted for attachment to a panel, comprising:
    a base having a base surface and a bore formed in the base surface and extending through the base, the bore comprising at least one shoulder,
    at least one first leg having a first end and a second end, the first end of the first leg coupled to the base, the first leg extending substantially perpendicularly from the base surface and comprising means for predictably deforming the first leg when a compression force is applied across the first end and the second end of the first leg,
    a terminal end coupled to the second end of the first leg,
    a second leg having a first end and a second end, the first end of the second leg coupled to the terminal end, the second leg extending substantially perpendicularly from the terminal end and substantially in parallel with the first leg, the second end of the second leg being a free end and the second leg comprising:
    means for contacting the panel and generating the compression force when the terminal end is disposed within a mounting hole in the panel and the base is pushed towards the panel, the compression force generating means being adapted to transmit the compression force to the first end and second end of the first leg via the second leg and,
    means for engaging the bore shoulder when the first leg is in a compressed state to thereby reliably retain the first leg in the compressed state.

17. An apparatus as in claim 16 wherein:
    the means for predictably deforming the first leg when a compression force is applied across the first end and second end of the first leg is selected from the group consisting of a thinned portion, a score line, a crease and a perforation,
    the means for generating the compressing force to the first and second end of the first leg comprises a stopper projection adapted to contact a panel surface and,
    the means for engaging the bore shoulder comprises an engagement lip.

18. An apparatus as in claim 17 further comprising a positioning pin extending substantially perpendicularly from the base surface and substantially in parallel with the first leg and the second leg.

19. An apparatus as in claim 16, wherein:
    the means for predictably deforming the first leg when a compression force is applied across the first end and second end of the first leg comprises a thinned portion,
    the means for generating the compressing force to the first and second end of the first leg comprises a stopper projection adapted to contact a panel surface and,
    the means for engaging the bore shoulder comprises an engagement lip.

20. An apparatus as in claim 19 further comprising a positioning pin extending substantially perpendicularly from the base surface and substantially in parallel with the first leg and the second leg.

21. An apparatus is in claim 20 wherein the means for predictably deforming the first leg when a compression force is applied across the first end and second end of the first leg comprises three thinned portions adapted to permit the first leg to bend into a V shape when the compression force is applied across the first end and second end of the first leg.

22. An apparatus adapted for attachment to a panel, comprising:
    a base having a base surface and a bore formed in the base surface and extending through the base, the bore comprising a pair of opposed shoulders,
    a pair of first opposed legs each having a first end and a second end, the first ends of the first opposed legs coupled to the base, the first opposed legs extending substantially perpendicularly from the base surface, each first opposed leg comprising means for predictably deforming the first opposed legs when a compression force is applied across the first end and the second end of the first opposed legs selected from the group consisting of a thinned portion, a score line, a crease and a perforation,
    a terminal end coupled to the second end of each first opposed leg,
    a pair of second opposed legs each having a first end and a second end, the first ends of the second opposed legs coupled to the terminal end, the second opposed legs extending substantially perpendicularly from the terminal end and substantially in parallel with the pair of first opposed legs, each second end of the second opposed legs being a free end and each of the second opposed legs comprising:

a stopper projection extending substantially perpendicularly from the second opposed legs, wherein the stopper projection is arranged and constructed (1) to contact the panel and generate the compression force when the terminal end is disposed within mounting hole in the panel and the base is pushed towards the panel, and (2) to transmit the generated compression force to the first end and second end for the first opposed legs via the second opposed legs and, a lip adapted to engage the bore shoulder, the lip formed at or near the second end of the second opposed leg.

23. An apparatus as in claim 22 further comprising a positioning pin extending substantially perpendicularly from the base surface and substantially in parallel with the first opposed legs and the second opposed legs.

24. An apparatus s in claim 23 wherein the means for predictably deforming the first opposed legs when a compression force is applied across the first end and second end of the first opposed legs comprises three thinned portions adapted to permit the first opposed legs to bend into a V shape when the compression force is applied across the first end and second end of the first opposed legs.

* * * * *